United States Patent
Boyer et al.

(10) Patent No.: US 6,720,871 B2
(45) Date of Patent: Apr. 13, 2004

(54) MODULATED INTENSITY FLASHER FOR VEHICLE BRAKE LIGHT WITH LOCKOUT

(75) Inventors: Clyde H. Boyer, Concord, OH (US); Edward J. Stropkay, Chesterland, OH (US); Robert C. Morris, Jr., Pennellville, NY (US)

(73) Assignee: TransAlert, Inc., Cleveland, OH (US)

( * ) Notice: Subject to any disclaimer, the term of this patent is extended or adjusted under 35 U.S.C. 154(b) by 112 days.

(21) Appl. No.: 10/027,093

(22) Filed: Dec. 20, 2001

(65) Prior Publication Data

US 2002/0075148 A1 Jun. 20, 2002

Related U.S. Application Data

(60) Provisional application No. 60/257,324, filed on Dec. 20, 2000.

(51) Int. Cl.⁷ .............................. B60Q 1/22; B60Q 1/50; B60Q 1/26; B60Q 1/34
(52) U.S. Cl. ...................... 340/479; 340/463; 340/464; 340/467; 340/468
(58) Field of Search ................................ 340/463, 464, 340/467, 468, 479

(56) References Cited

U.S. PATENT DOCUMENTS

| | | | |
|---|---|---|---|
| 3,875,559 A | | 4/1975 | Szekessy |
| 4,403,210 A | * | 9/1983 | Sullivan ..................... 340/479 |
| 4,843,368 A | | 6/1989 | Poulos |
| 4,843,627 A | | 6/1989 | Stebbins |
| 4,987,405 A | | 1/1991 | Jakobowski |
| 5,001,398 A | * | 3/1991 | Dunn .......................... 315/77 |
| 5,148,147 A | | 9/1992 | Kobres |
| 5,260,685 A | * | 11/1993 | Parker ........................ 340/477 |
| 5,345,218 A | | 9/1994 | Woods et al. |
| 5,491,383 A | | 2/1996 | Leiber et al. |
| 5,517,064 A | * | 5/1996 | Murakami ................. 307/10.1 |
| 5,565,841 A | | 10/1996 | Pandohie |
| 5,785,405 A | | 7/1998 | Huhn |
| 5,909,174 A | | 6/1999 | Dietz et al. |
| 6,175,305 B1 | | 1/2001 | Johnson et al. |
| 6,414,437 B1 | * | 7/2002 | Diez et al. ..................... 315/77 |

* cited by examiner

*Primary Examiner*—Jeffery Hofsass
*Assistant Examiner*—Lam Pham
(74) *Attorney, Agent, or Firm*—Fay, Sharpe, Fagan, Minnich & McKee, LLP

(57) ABSTRACT

A method and apparatus for brightening and dimming a brake light of automotive vehicle for enhanced display indication of braking includes a pulse width modulation unit to be electrically connected to a brake lamp for sequentially modulating the supply energy to the lamp to generate a brightening and dimming of the lamp. A time extent of the modulation is detected so that the modulation can be stopped after a preselected time period and the light will be continually on as in a conventional braking operation After the brake is released by the operator, a second preselected time period for locking out the sequential interrupting is timed down, for avoiding repetitive flashing during stop-and-go traffic.

9 Claims, 4 Drawing Sheets

MODULATED INTENSITY FLASHER FOR VEHICLE BRAKE LIGHT WITH LOCKOUT

This application claims priority from Provisional Application Ser. No. 60/257,324 filed on Dec. 20, 2000.

BACKGROUND OF THE INVENTION

This invention pertains to the art of electrical lighting control systems, and more particularly to automotive control systems relating to signaling of a braking of the vehicle via a brake light.

The invention is particularly applicable to either integral assembly or, supplemental addition by kit, of a flasher control unit for a middle brake light of an automobile for enhanced display indication of braking of the vehicle. However, it will be appreciated to those skilled in the art that the invention can be readily adapted for use in other environments as, for example, where similar cautionary signaling is regularly provided, and where in certain circumstances, usually relating to time, an inhibiting of the precautionary signaling is desired to avoid repetitive or irritating flashing.

As our road system becomes more crowded and concern for driver safety continues to increase due to the dangers of such increased traffic density, concerns have naturally arisen about improved signaling of adjacent vehicle operations to drivers. Crowded superhighway conditions particularly present the need for such improved signaling. The middle brake light, commonly positioned in the back window of a vehicle, presents a more visible brake light to a following driver since it is raised from the conventional tail light position to about eye level to be more noticeable.

The subject invention is concerned with enhanced signaling of braking operations, and is particularly concerned with adjusting the operation of the middle brake light in such a way that it can be even more clearly perceptible to a following car that the preceding vehicle has begun a braking event.

In recent years, design trends have been to make the brake light larger and higher on the vehicle, but flashing has been primarily limited to emergency vehicles. Consumer vehicles have used flashing lights as a safety warning to following drivers when the flashers have been used because the vehicle is stopped, usually on a road side. People are thus generally aware that a flashing light, particularly on a road, is a signal for special concern.

The subject invention seeks to exploit the awareness of the accepted meaning of a flashing light, as well as its greater noticeability, to provide a safer signaling system for a vehicle braking event.

Although brake light flashing systems are known (e.g., U.S. Pat. No. 5,565,841), such systems comprise prolonged interruptions of the power signal to the lamp, i.e., where the lamp is perceived as completely on or completely off De-powering a brake lamp during a braking event, so that the lamp is perceived as off, is not desirable for safety reasons, and in some jurisdictions is illegal.

The present invention contemplates a new and improved device which overcomes the above referenced problems and satisfies the foregoing design objectives to provide a new brake light interval modulation unit with flasher lockout, which is simple in design, economical to manufacture, readily adaptable to a plurality of uses with vehicle brake lights having a variety of conventional characteristics, easy to install, and which provides improved safer and more noticeable signaling of vehicle braking.

BRIEF SUMMARY OF THE INVENTION

In accordance with the present invention there is provided a control system for modulating the intensity of a vehicle's brake light for enhanced display indication of the braking of the automobile. The system includes a modulation unit sized to be disposed within the brake light and interposed electrically between a lamp of the brake light and an energy supply. The unit includes a circuit for sequentially adjusting power from the energy supply to the lamp for a first determined time interval simultaneous with the braking of the automobile for generating a desired intensity flashing of the lamp, while continuously supplying a steady power level to the lamp after expiration of the first timer interval and during continued braking. A lockout timer precludes the flashing of the brake lamp by the unit for a second predetermined time interval after release of the braking for avoiding repetitive flashing in stop-and-go traffic.

The unit includes a modulator serially connected between the lamp and the energy supply, and a processor for adjusting the power level corresponding to the desired intensity flashing. The processor includes an internal oscillator, selectively programmable for controlling a rate of the sequential adjusting.

The lockout timer may comprises a capacitor sized to discharge at a rate after the release of the brake, wherein a failure to discharge below a certain level is indicative of the precluding of the sequentially adjusting.

In accordance with another aspect of the present invention a method is provided for operating an interval intensity modulator comprising a brake light of a vehicle for improved indication of braking of the vehicle. The method comprises steps of detecting the braking of the vehicle by the transmitting of a supply of energy to the brake light coincident with the braking The next step comprises sequentially adjusting the supply of energy via a modulator connected to the light for generating a flashing intensity of the light during braking. The time extent of the flashing is detected so that the flashing can be stopped after a preselected time period so that the light will then be continually on during the braking. After the brake is released, a second preselected time period is detected for locking out the flashing to avoid excessive repetitive flashing during stop-and-go traffic.

In accordance with yet another aspect of the present invention there is provided a brake light comprising a first region operative as a conventional brake light and a second region separately controlled from the first region. A controller is operative to time a braking event and a period between braking events and to selectively modulate the second region based on the timing of the braking event and a period between braking events.

For example, the first region includes red light emitting diodes and the second region includes yellow light emitting diodes, although incandescent lights could also be used. For instance, the first region may meet all the regulatory requirements of a brake light. Therefore, the second region can be modulated as desired for maximum impact on the perception of a following driver.

In accordance with still another aspect of the present invention a brake light controller is provided that is operative to modulate a current through a light source. The brake light controller comprises a pulse width modulator operative to selectively modulate an average current through the light source, a lockout timer operative to prevent the pulse width modulator from modulating the average current through the light source if the current through the light source had been modulated recently, and, a modulation interval timer operative to limit a length of time the pulse width modulator modulates the average current through the light source.

One benefit obtained by use of the present invention is a brake unit which provides enhanced indication of the braking of the vehicle.

Another benefit obtained by the present invention is an intensity flasher which can avoid repetitive, irritating flashing during frequent braking of the vehicle, such as during stop-and-go traffic.

Another benefit of the subject invention is a modulating unit which can be integrally formed into a circuit element conveniently sized for locating in the casing of a brake light, and thus is particularly well suited to add on in kit form, but can also be original equipment.

Other benefits and advantages for the subject new modulation unit will become apparent to those skilled in the art upon a reading and understanding of this specification.

BRIEF DESCRIPTION OF THE DRAWINGS

The invention may take physical form in certain parts and arrangements of parts, and in certain procedures and arrangements of procedures, the preferred embodiments of which will be described in detail in this specification and illustrated in the accompanying drawings which form a part hereof and wherein.

DETAILED DESCRIPTION OF THE INVENTION

Figure 1:
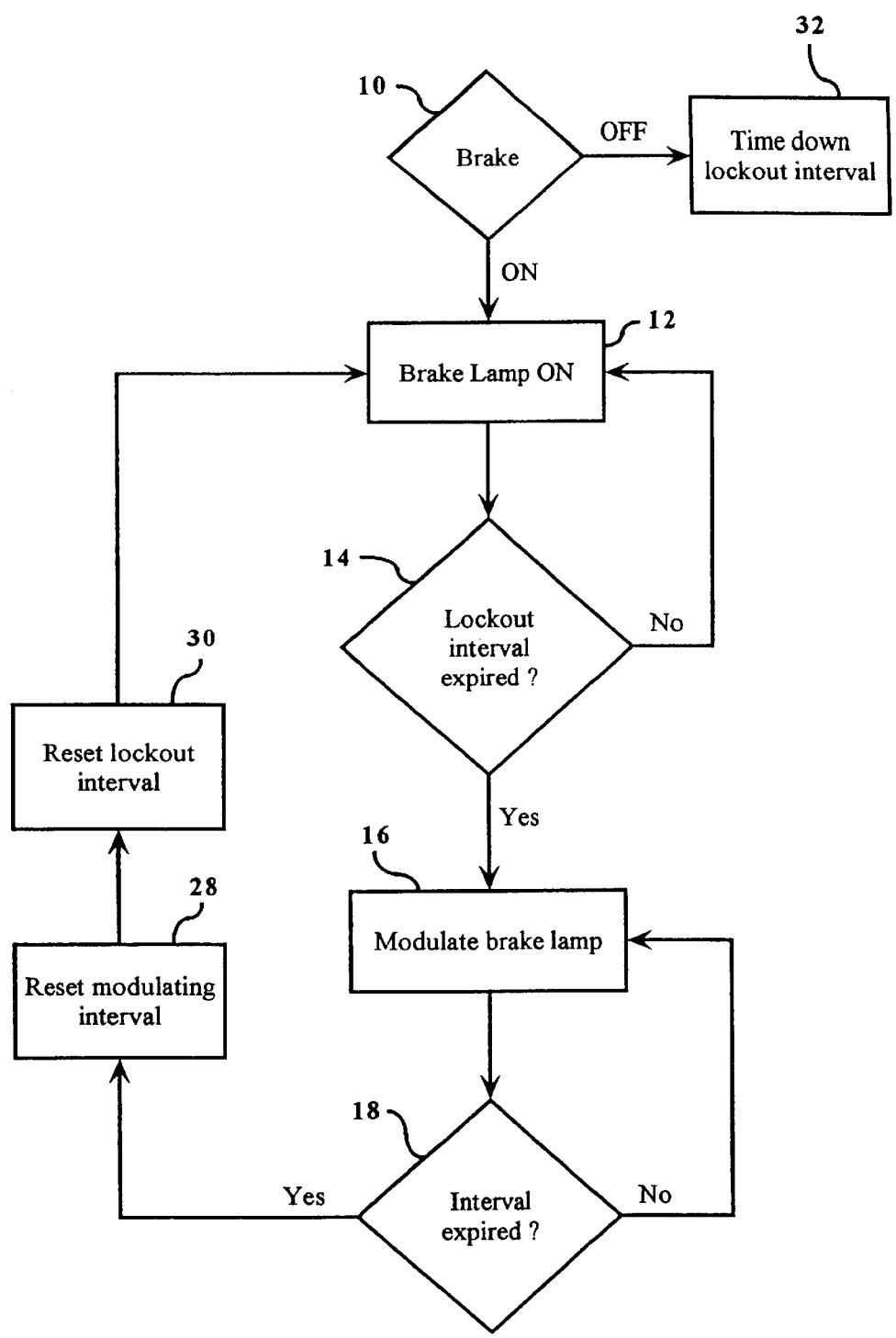
FIG. 1 is a flow chart of a method of signaling the occurrence of a braking event.
Figure 2:
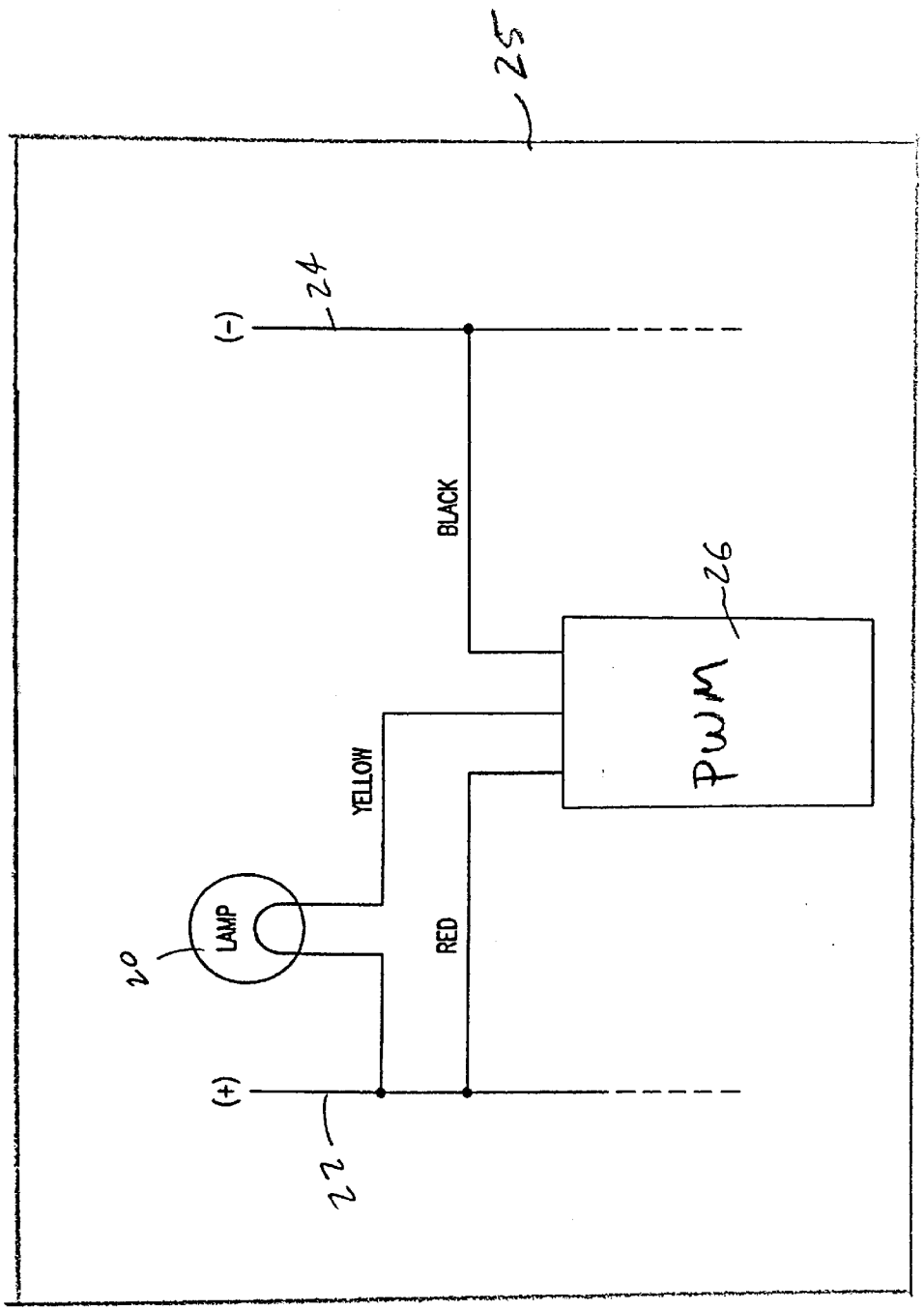
FIG. 2 is a block diagram of a processing unit installed in a vehicle brake light.

Referring now to the drawings wherein the showings are for purposes of illustrating the preferred embodiments of the invention only, and not for purposes of limiting same, the FIGURES show an interval modulator control with lockout that is particularly useful for adjusting the operation of a vehicle brake light for enhanced display indication of the braking of a vehicle More particularly, and with reference to FIG. 1, the invention provides for the limited modulation of a brake light to signal the braking of a vehicle, but also precludes modulation if the brake is applied more than once within a preset time period to avoid annoying, repetitive flashing of the brake lights. The system will determine if a brake light is on or off by the detection of the supply of current to the brake lamp. Accordingly, as a user hits the brake, the brake lamp will turn on 12. If this is an initial application of the brakes so that it is desired to brighten and dim the unit so adjacent operators will especially notice the change in intensity of the light signal, and more readily recognize that the vehicle is being braked, then the unit will modulate the power signal to the lamp. In such case the power will never be perceived to be completely off to the brake lamp, either because the power is never turned completely off or because the power is turned on and off so quickly that the brake light source is never perceived as being extinguished. However, the modulating of the power will present an appearance of flashing intensity to an observer. With reference to FIG. 2, it can be seen that the lamp 20 would normally be serially disposed between positive 22 and negative 24 power lines, which are controlled in a conventional manner by the application of the brake (not shown) by the user.

The subject invention comprises a processing unit 26 which is shown to be serially interposed between power line 24 and the lamp 20, and also connected to the other power line 22 to form a complete circuit. A pulse width modulation or microprocessor timing device can perform the processing required by the unit 26. Alternatively, the processing unit 26 is implemented with a small set of inexpensive integrated circuits such as CMOS binary counter and logic gates, as will be apparent to those of ordinary skill in the art The processing unit 26 is sized to be fitted even as an add-on within conventionally sized brake light casing 25, e.g. approximately between one and three cubic inches. When modulation is desired, the unit 26 will affect the power delivered to the lamp 20 with a control element such as a transistor interposed between the lamp 20 and at least one of the power lines 22, 24 to cause the lamp to effectively brighten and dim.

There are two predetermined time intervals which are set to control how long the modulation occurs and when it can occur. Returning to the flow chart of FIG. 1, after it is determined that the brake lamp is on, the system will determine whether or not the lock out interval is expired 14. By "lockout interval" is meant the time period in which modulation of the brake lamp is effectively locked out, i.e., should not occur. If the lock out has expired, then it is appropriate to modulate the brake lamp and this occurs at step 16. So long as the brake remains in continuous operation, the system will cause the brake lamp to brighten and dim for an interval. When the interval has expired 18, then the system will reset the modulation interval 28 and reset the lock out interval 30 so that the brake lamp will remain on 12, and so that no modulation can occur unit the lock out interval has timed out 32, which time out can only occur during the brake being off or in a released state.

It is a feature of the invention that the lockout interval precludes repetitive modulation when the brake has not been released for a long enough time to allow the lockout interval to expire, for example, 40 seconds. Thus, if the vehicle operator were in stop-and-go traffic, so that the brake is repeatedly applied in intervals of less than 40 seconds, the modulation would not occur, but rather the brake light would operate in a completely conventional manner and would be continuously on for the time period that the brake is set The invention operates to especially attract the attention of a following operator when a brake is first being applied at intervals in excess of the 40 second lock out period Concerning the modulation interval, again this is a matter of subject of determination, about 5 seconds of modulation has met expectations. The modulation can result in a variety of flashing frequencies so long as it is easily recognizable, e.g. a flash per second.

The invention can be disposed in any of a number of brake lights, for example, in an passenger vehicle the invention can be disposed within the middle brake light of an automobile which is typically positioned within a rear window. Alternatively, the light could be placed in other easily recognizable locations such as the rooftop or a rear and central vehicle area. The remaining two brake lights on rear tail fenders will operate in a conventional manner.

Figure 3:
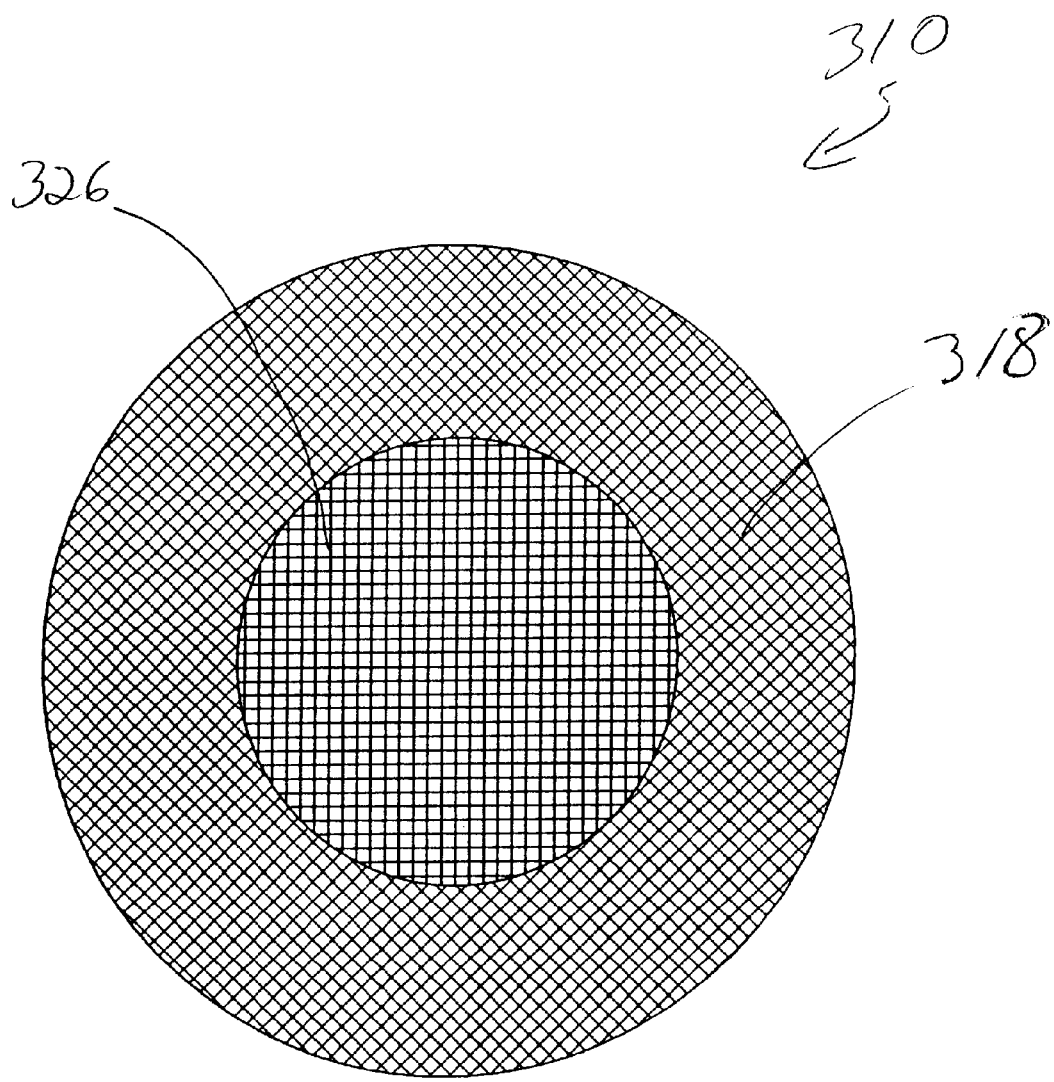
FIG. 3 is a front elevation of a two-region brake light.

Alternatively, the invention can be disposed in other places. For example, the invention can be disposed in optional or mandatory, tractor-trailer truck brake lights. For instance, referring to FIG. 3 a trailer-mounted brake light 310 includes a first or red light region 318 and a second or yellow light region 326. The red light region 318 and the yellow light region 326 are in the form of concentric circles. The yellow light region 326 is smaller than, and centrally located within, the red light region 318. Therefore, the red light region 318 forms and annular ring around the yellow light region 326.

However, other light region arrangements are contemplated, such as for example, both regions may be red, the regions may have other shapes such as square or rectangular or of some esthetically pleasing shape Furthermore, one region may be distributed evenly throughout the other, so that in what appears at first to be a single region, some light emitting diodes belong to the first region, while others, interspersed between the light emitting diodes of the first region make up the second region.

The first or red light region 318 includes red light emitting diodes (see FIG. 3) or lamps. Alternatively, a conventional lamp and red filter arrangement may be used. The yellow light region 326 includes yellow light emitting diodes (see FIG. 3) or lamps. Alternatively, a conventional lamp and yellow filter arrangement may be used. Preferably, the red light region 318 conforms to statutes and regulations with regard to break light output intensity, visibility, beam pattern and other pertinent parameters. In this regard, the second or yellow light region 326 is optional equipment whose operation is unrestricted by statue or regulation. In operation, the red light region 318 is operated as a conventional brake light. The red light region 318 is simply lit during any braking event i.e.; whenever the vehicle brake actuator is actuated. In contrast, the yellow light region 326 is operated according to the method of limited modulation described in reference to FIG. 1. Assuming that the lockout period has expired when the vehicle brake actuator is actuated, the yellow light region 326 is flashed or modulated between two or more levels of light intensity for a predetermined period of time after the initial application of the brakes. For example, the second region is flashed for about 5 seconds. After this modulation interval has expired, the second or yellow light region 326 is maintained at a constant brightness. If at any time the brake actuator is released or returned to a released brake position both the red and yellow light regions 318, 326 are extinguished. During subsequent brake application, the operation of the yellow light region depends on whether or not a lockout time has expired since the end of a previous brake application. If the lockout time has not expired, the second or yellow light region 326 is operated to produce a constant light intensity. If the lockout interval has expired, the yellow light region 326 is flashed as described above.

Figure 4:
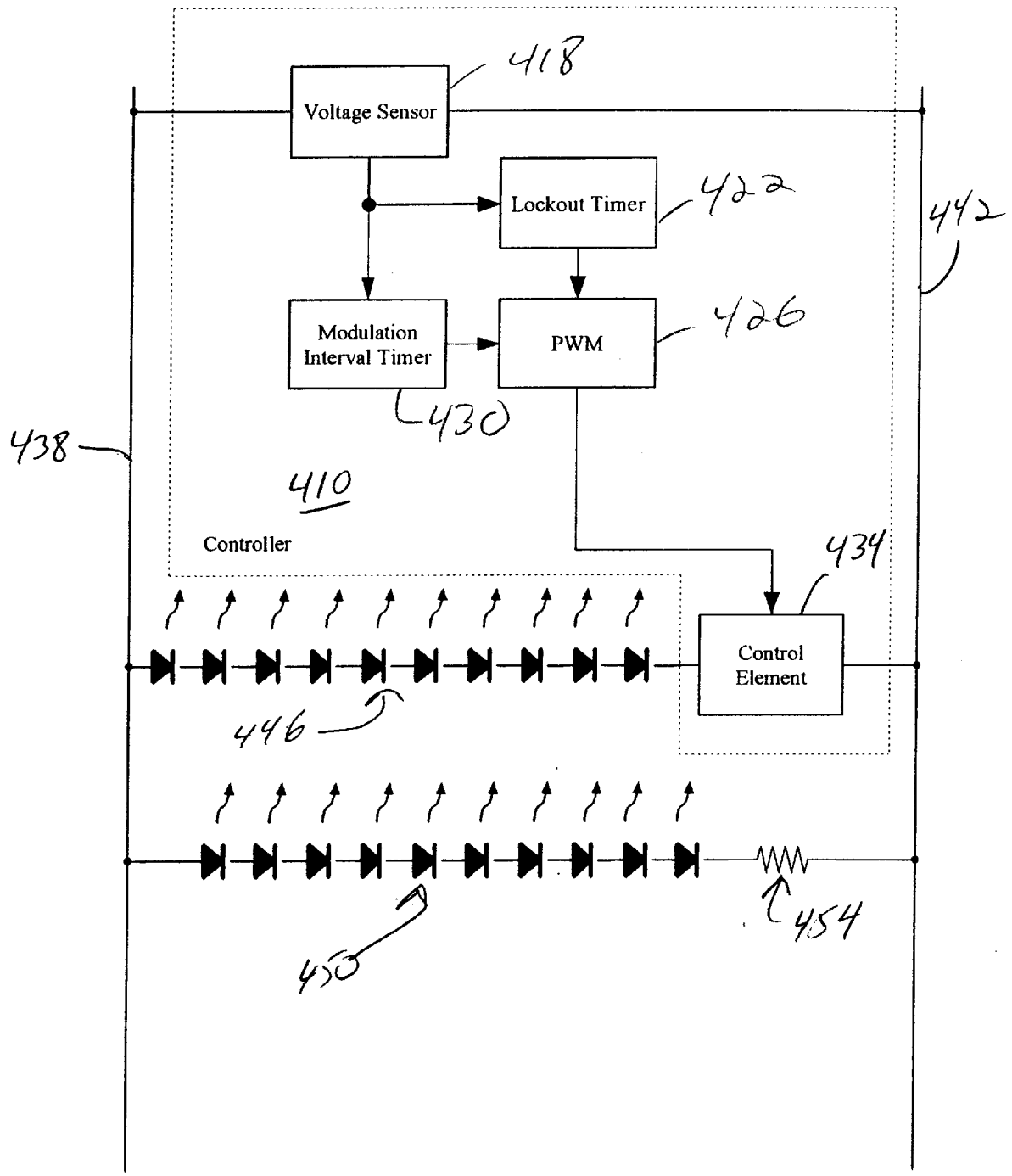
FIG. 4 is a block diagram including a controller operative to control the modulation of a light source according to the method of signaling an occurrence of a braking event.

Referring to FIG. 4, a controller 410 operative to control the trailer-mounted brake light 310 includes a voltage sensor 418, a lockout timer 422, a pulse width modulator 426, a modulation interval timer 430 and a control element 434.

The voltage sensor 418 can take the form of an appropriately designed controller power supply or can be a circuit dedicated to sensing the state of a brake actuator switch signal line 438. For example, a voltage on a conventional brake actuator switch signal line 438 is compared to a voltage of a common 442 or ground line or vehicle chassis. The sensed state of the brake actuator switch signal line 438 is reported to the lockout timer 422 and the modulation interval timer 426. The brake actuator switch signal line 438 can have one of two states. The brake actuator switch signal line 438 can be high to report that the brake actuator is in a brakes applied position or the brake actuator switch signal line 438 can be low to report that the brake actuator is in a brakes unapplied position. The lockout timer 422 begins to run if the state of the brake actuator signal line 438 changes from a brakes applied (high) state, to a brakes unapplied (low) state. The modulation interval timer begins to run whenever the voltage sensor 418 reports that the brake actuator switch signal line 438 changes from a brake actuator unapplied state to a brake applied state The pulse width modulator 426 receives control signals from the lockout timer 422 and the modulation interval timer 430. The control signal from the lockout timer 422 can have one of two states. The two states are a lockout state and an enable state. The control signal from the modulation timer 430 can also have one of two states. The two states are a modulate state and a constant brightness state. The signal from the lockout timer 422 is in the lockout state while the lockout timer is running, or when the lockout time has not expired. When the lockout time has expired, the signal from the lockout timer is changed to, and maintained in, the enable state. The control signal from the modulation timer 430 is in the modulate state while the modulation interval timer is running. When the modulation time has expired the control signal from the modulation timer 430 is changed and maintained in the constant brightness state. When the signal from the lockout timer 422 is in the enable state and the signal from the modulation interval timer 430 is in the modulate state, the pulse width modulator produces a pulse width modulated control signal for driving the control element 434. The pulsing control signal causes the control element 434 to vary an average amount of current able to flow through the control element 434. For example when the pulse width modulated control signal is at a high level a maximum current may flow through the control element. When the pulsing control signal is at a low level, only a minimum amount of current may flow through the control element 434. For instance, when a pulse width of the pulse width modulated control signal is relatively wide, a relatively large average current is allowed to flow through the control element. When the pulse width of the pulse width modulated control signal is relatively narrow, a relatively small average current is allowed to flow through the control element 434.

A first set of light emitting diodes 446 or other light sources, such as, for example, yellow light emitting diodes mounted in the yellow light region 326 of the trailer-mounted brake light 310 is connected at a first end to the brake actuator signal line 438 and at a second end to an input side of the control element 434. The output side of the control element is connected to common 442. An amount of current flowing through the first light emitting diodes 446 is thereby made equal to the amount of current flowing through the input and output terminals of the control element 434. When a relatively large average current is flowing through the control element 434, the same relatively large average current is flowing through the first set of light emitting diodes 446 and the first set of light emitting diodes 446 produce a relatively bright light. When a relatively small average current is flowing through the control element 434, the same relatively small average current is flowing through the first set of light emitting diodes 446, and the first set of light emitting diodes 446 produce a relatively dim beam of light. Therefore, as pulse width modulator 426 modulates the average current through the control element 434 the average current through the first set of light emitting diodes 446 is also modulated, thereby modulating the amount of light produced by the first set of light emitting diodes 446.

If the control signal from the lockout timer 422 is in the lockout state, then the signal from the pulse width modulator is set at a constant level. Preferably, the signal from the pulse width modulator is set to allow a maximum amount of current to flow through the control element 434 and therefore a maximum amount of current is allowed to flow through the first set of light emitting diodes 446.

Similarly, if the control signal from the modulation interval timer 430 is in the constant brightness state the signal from the pulse width modulator is set at a constant level. Preferably, the signal from the pulse width modulator is set to allow a maximum amount of current to flow through the control element 434 and therefore a maximum amount of current is allowed to flow through the first set of light emitting diodes 446.

Of course, current can only flow through the first set of light emitting diodes 446 if a voltage or signal level on the brake actuator signal line 438 is high enough to drive current through the light emitting diodes 446 and the control element 434. Therefore, the first set of light emitting diodes 446 can only be modulated or driven at a steady level when the brakes are applied and the brake actuator signal line 438 is at a high level A second set of light emitting diodes 450 or other light source, such as the light emitting diodes of the red light region 318 of the trailer mounted brake light 310 are connected at a first end to the brake actuator signal line 438 and at a second end to a current limiting resister 454. A second end of the current limiting resister 454 is connected to common 442. Therefore, whenever the brakes are applied and the brake actuator signal line 438 is at a high level, the second set of light emitting diodes 450 is driven at a steady current level and the second set of light emitting diodes 450 produces a steady level of light.

The controller 410 can be implemented in a simple micro-controller In that case, the various timers 422, 430, and the pulse width modulator 426 are implemented in software or hardware or some combination thereof Alternatively, the various components 422, 430, 426 of the controller 410 can be implemented with counters and logic gates, such as for example the well known MC14060 14-Bit binary counter and oscillator, and various logic gates such as common NAND and NOR gates. The control element can be a transistor, such as for example a MOSFET or BJT type transistor, Of course, the control element is preferably selected for an appropriate voltage and current handling ability. While the first and second sets of light emitting diodes 446, 450 have been illustrated as a single series connected string, other arrangements are possible. For example, additional strings of light emitting diodes can be connected in parallel to the shown sets. In that case in may be necessary to increase the current carrying capability of the control element 434 and/or the current limiting resistor 454.

The invention has been described with reference to preferred embodiments. Obviously, modifications and alterations will occur to others upon the reading and understanding of this specification. It is our intention to include all such modifications and alterations in so far as they come within the scope of the appended claims or the equivalents thereof.

Having thus described our invention, we now claim:

1. A control system for modulating a brake light region of an automobile for enhanced display indication of braking of the automobile comprising:
    an integral modulation unit sized to be disposed within a casing of the brake light and interposed between a lamp of the brake light and an energy supply;
    wherein the modulation unit includes means for sequentially adjusting power from the energy supply to the lamp for a first predetermined time interval concurrent with the braking of the automobile for generating a desired brightening and dimming of the lamp, and continuously supplying a constant power to the lamp after expiration of the first predetermined time interval during continued braking; and,
    a lockout timer for precluding the sequential adjusting by the modulation unit for a second predetermined time interval after release of the braking for avoiding repetitive flashing in stop and go traffic wherein the modulation unit and lockout timer cooperate to time the braking and a period between brakings for the modulating of the brake light based on the timing of the braking and the period between the brakings.

2. The control system as defined in claim 1 wherein the modulation unit includes a pulse width modulator serially connected between the lamp and the energy supply including a processor for lowering lamp power at selected intervals corresponding to the desired modulation, and wherein the processor includes an internal oscillator, selectively setable for controlling a rate of the adjusting.

3. The control system as defined in claim 2 wherein the lockout timer comprises a capacitor sized to discharge at a rate after the release of the brake wherein a failure to discharge below a preselected level is indicative of the precluding of the sequential interrupting.

4. A brake light comprising:
    a first region operative as a conventional brake light;
    a second region separately controlled from the first region;
    a controller operative to time a braking event and a period between braking events and to selectively modulate the second region based on the timing of the braking event and a period between braking events.

5. The brake light of claim 4 wherein the first region comprises red light emitting diodes.

6. The brake light of claim 4 wherein the second region comprises yellow light emitting diodes.

7. The brake light of claim 4 wherein the controller comprises a lockout timer operative to compare a time interval between a previous braking event and a current braking event to a threshold time interval.

8. The brake light of claim 4 wherein the controller comprises a modulation interval timer operative to compare a duration of a braking event to a threshold time interval.

9. The brake light of claim 4 wherein the controller comprises a pulse width modulator operative to control a control element to modulate a current through light producing components of the second region.

* * * * *

(12) EX PARTE REEXAMINATION CERTIFICATE (10724th)
United States Patent
Boyer et al.

(10) Number: US 6,720,871 C1
(45) Certificate Issued: Sep. 30, 2015

(54) MODULATED INTENSITY FLASHER FOR VEHICLE BRAKE LIGHT WITH LOCKOUT

(75) Inventors: Clyde H. Boyer, Concord, OH (US); Edward J. Stropkay, Chesterland, OH (US); Robert C. Morris, Jr., Pennellville, NY (US)

(73) Assignee: TRANSALERT, LLC, Cleveland, OH (US)

Reexamination Request:
No. 90/013,352, Oct. 27, 2014

Reexamination Certificate for:
Patent No.: 6,720,871
Issued: Apr. 13, 2004
Appl. No.: 10/027,093
Filed: Dec. 20, 2001

Related U.S. Application Data

(60) Provisional application No. 60/257,324, filed on Dec. 20, 2000.

(51) Int. Cl.
*B60Q 1/44* (2006.01)
(52) U.S. Cl.
CPC ...................................... *B60Q 1/444* (2013.01)

(58) Field of Classification Search
None
See application file for complete search history.

(56) References Cited

To view the complete listing of prior art documents cited during the proceeding for Reexamination Control Number 90/013,352, please refer to the USPTO's public Patent Application Information Retrieval (PAIR) system under the Display References tab.

*Primary Examiner* — James Menefee

(57) ABSTRACT

A method and apparatus for brightening and dimming a brake light of automotive vehicle for enhanced display indication of braking includes a pulse width modulation unit to be electrically connected to a brake lamp for sequentially modulating the supply energy to the lamp to generate a brightening and dimming of the lamp. A time extent of the modulation is detected so that the modulation can be stopped after a preselected time period and the light will be continually on as in a conventional braking operation After the brake is released by the operator, a second preselected time period for locking out the sequential interrupting is timed down, for avoiding repetitive flashing during stop-and-go traffic.

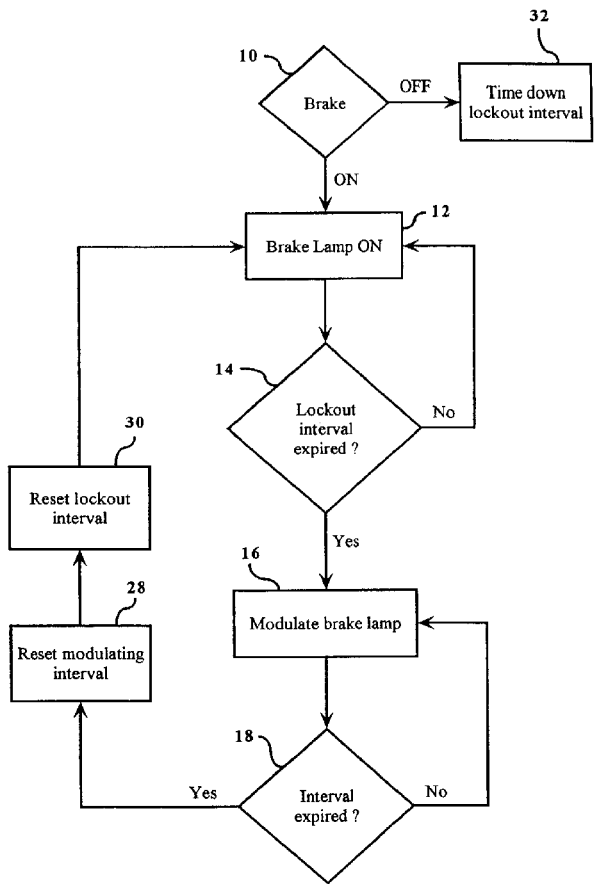

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 1-3 is confirmed.

Claims 4-9 are cancelled.

\* \* \* \* \*